Jan. 1, 1924

B. BROIDO 1,479,279

METHOD OF MAKING RETURN BENDS

Filed Sept. 15, 1922

5 Sheets-Sheet 1

BENJAMIN BROIDO Inventor

By his Attorney O. V. Thiele

Jan. 1, 1924

B. BROIDO

METHOD OF MAKING RETURN BENDS

Filed Sept. 15, 1922

1,479,279

5 Sheets-Sheet 2

BENJAMIN BROIDO
Inventor

By his Attorney O. V. Thiele

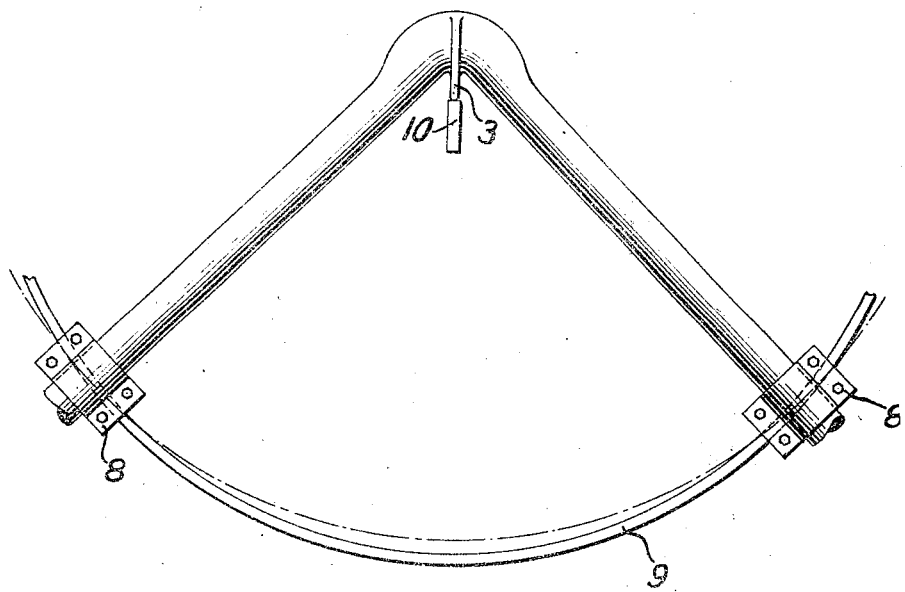
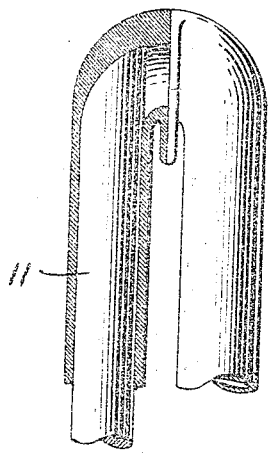
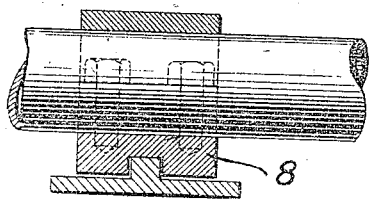

Jan. 1, 1924
B. BROIDO
1,479,279
METHOD OF MAKING RETURN BENDS
Filed Sept. 15, 1922
5 Sheets-Sheet 4
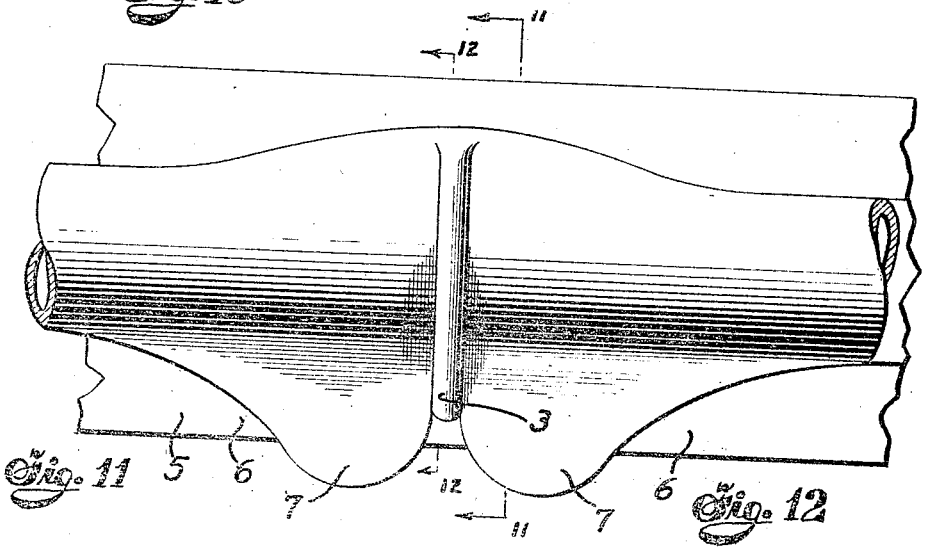
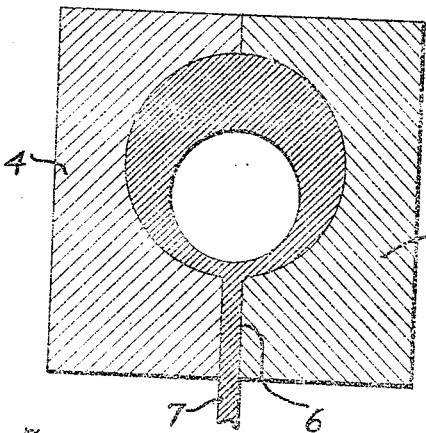
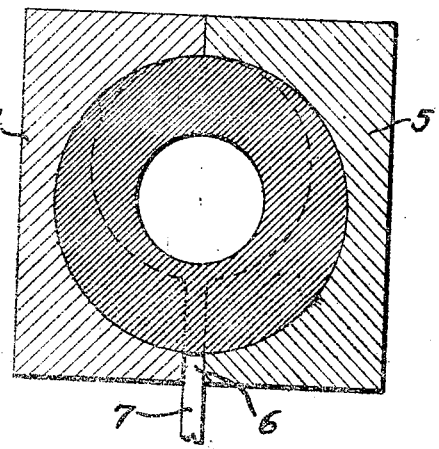
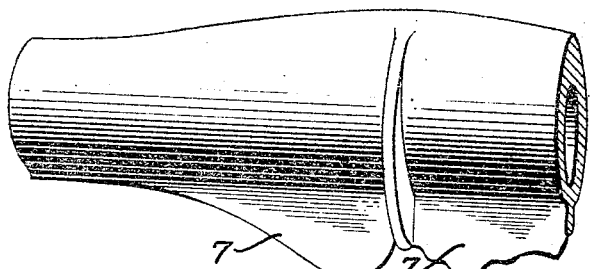
BENJAMIN BROIDO
Inventor
By his Attorney O. V. Thiele Jan. 1, 1924
B. BROIDO
METHOD OF MAKING RETURN BENDS
Filed Sept. 15, 1922      5 Sheets-Sheet 5
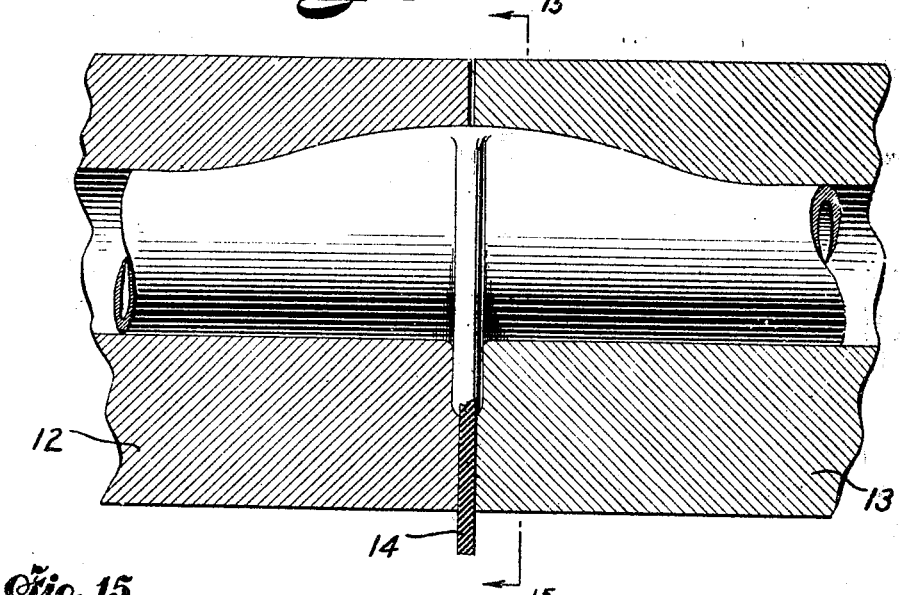
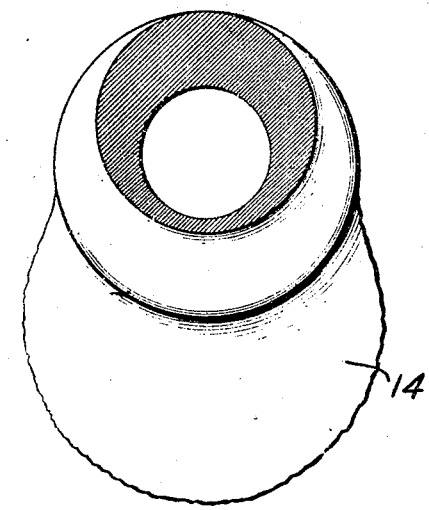
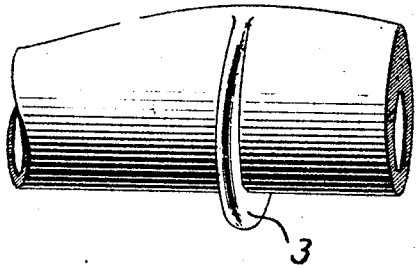
BENJAMIN BROIDO Inventor
By his Attorney O. V. Thiele Patented Jan. 1, 1924.

1,479,279

UNITED STATES PATENT OFFICE.

BENJAMIN BROIDO, OF NEW YORK, N. Y., ASSIGNOR TO THE SUPERHEATER COMPANY, OF NEW YORK, N. Y.

METHOD OF MAKING RETURN BENDS.

Application filed September 15, 1922. Serial No. 588,498.

*To all whom it may concern:*

Be it known that I, BENJAMIN BROIDO, a citizen of the United States, residing at New York, N. Y., have invented certain new and useful Improvements in Methods of Making Return Bends, whereof the following is a specification.

The art to which this invention relates is that of making return bends that are integral with the pipes joined by them. I am aware that various methods for doing this have been proposed in the past, but the present one is novel as far as I am informed and possesses certain advantages not found in the previous methods.

Figure 2:
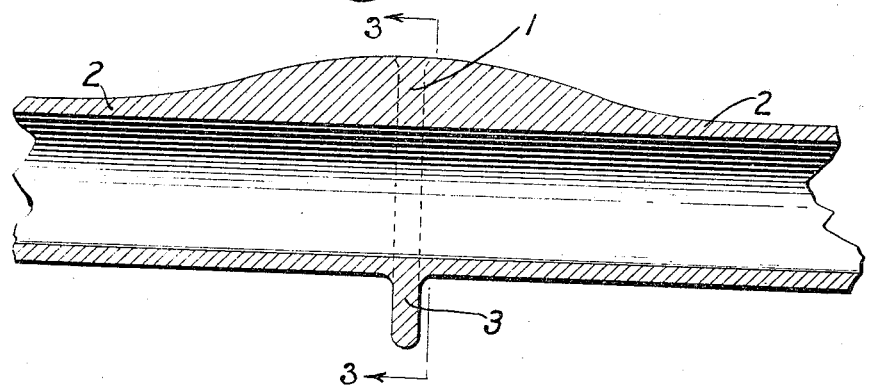
Figure 3:
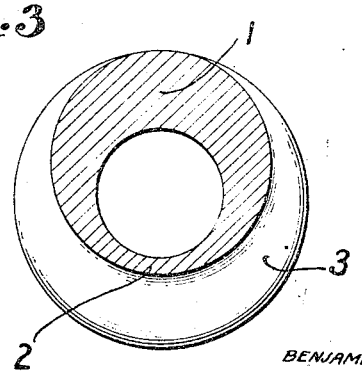
Figure 4:
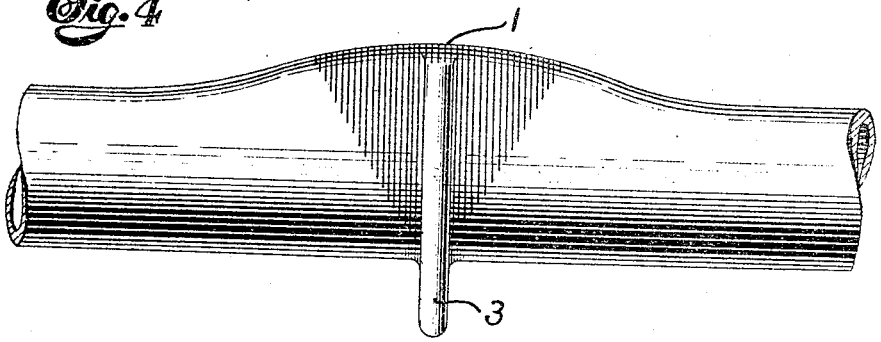
Figure 5:
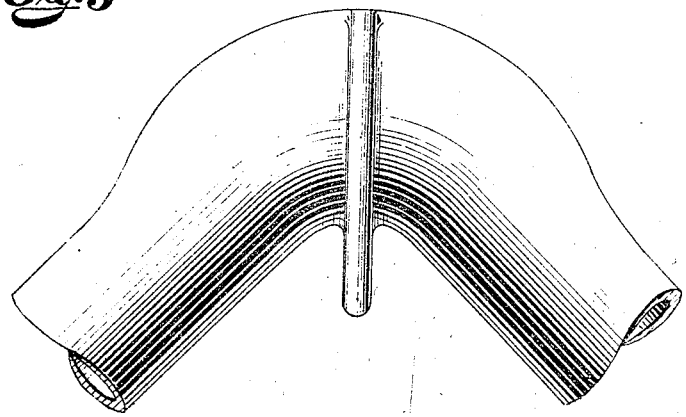
Figure 6:
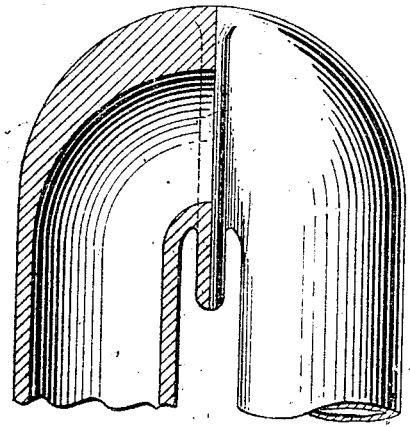

The manner of practicing my invention is shown by way of illustration in the accompanying drawings. Figs. 1 to 6 illustrate the appearance of the return bend at successive steps of the process, Fig. 1 being a central longitudinal section after upsetting the pipe, as will be described in detail below; Fig. 2 being a similar view at a subsequent stage; Fig. 3 being a sectional view on line 3—3 of Fig. 2; Fig. 4 illustrating how the structure is heated; Fig. 5 how it is next bent; and Fig. 6 showing the completed return bend. Fig. 7 illustrates, on a smaller scale, the apparatus and method of bending; Fig. 8 shows a detail of a clamp and guide of Fig. 7; Fig. 9 an optional finishing step that may at times be advisable. Figs. 10 to 12 show the dies used in producing the form shown in Figs. 1 and 3 from the upset form of Fig. 1. Of these, Fig. 10 shows in plan view one of the two symmetrical halves of the die with the return bend in its incomplete state in place in the die as it appears after the die has performed its work; Figs. 11 and 12 are, respectively, sectional views taken on lines 11—11 and 12—12 of Fig. 10. Fig. 13 is a perspective view of the incomplete return bend appearing in Fig. 10. Figs. 14 and 15 illustrate a modified die, the view being a longitudinal section of the dies and the return bend being shown as it looks after the dies have performed their stroke; Fig. 15 shows a sectional view on line 15—15 of Fig. 14 of the incomplete return bend as it comes out of these dies; and Fig. 16 is a perspective view of the incomplete return bend of Fig. 15 after a subsequent step.

It will be understood that throughout the views inessential portions have, in places, been broken away and omitted.

Return bends are made in two radically different ways, each involving its own problems. We start either with two originally separate pipes and unite them with a return bend, or with a single pipe which we bend so the two branches of the resulting structure were originally a single pipe length. My invention relates to the second way.

It is well known that a pipe can be bent quite satisfactorily through 180°, provided it is not bent on too small a radius. Usually precautions have to be taken even with a liberal radius to prevent collapse. That portion of the pipe lying at what becomes the outer portion of the bend is under tensile stress during the bending operation and there is the tendency for it to approach the opposite inner portion and for the adjacent portions on each side to move away from the pipe axis. In addition, the operation inevitably results in decreasing the thickness of the metal along the outer portion, due to the tensile stress mentioned. These difficulties increase as the radius is shortened, and beyond a certain shortness of radius no really satisfactory method of overcoming them is known. It is the object of the present invention to provide one.

Figure 1:
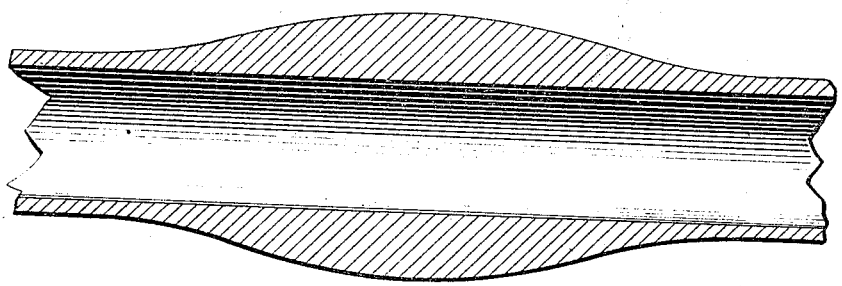

The first step in my method is to provide a thickening of the pipe at the region where the bend is to be made, as shown in Fig. 1. The precise manner of doing this is immaterial, any way of reaching the result being sufficient. The way I prefer is to upset the pipe, the operation being performed in several steps and the pipe being properly heated before each step. Where the pipes are drawn specially for this purpose it is quite feasible to leave them thick at the required places.

The next step is to give the thickened portions the shape shown best in Figs. 2, 3, 4, and 16. The maximum thickness of metal in this shape occurs at 1, a gradual taper to right and left (Fig. 2) along the pipe, and to right and left (Fig. 3) around the pipe bringing the thickness down to the normal pipe thickness at points marked 2. A rib 3 runs circumferentially around the pipe at the point of greatest thickness of the swelling.

To give the thickened portion of the pipe the shape just described, I prefer to use dies such as shown in Figs. 10 to 12. These dies comprise two symmetrical halves 4, 5, which, it will be understood are operated by suitable mechanism to open and close as required. The two halves when in the closed position have an opening extending through them which is the counterpart, except for one detail, of the shape decribed above and shown in Figs. 2, 3, 4, and 16. The detail mentioned is that on each side of the rib 3 there is a slot 6 extending from the hollow interior to the outside of the die. The pipe, shaped as in Fig. 1, and properly heated, is placed in the open dies, and a closing of the dies will result in giving the structure the shape of Figs. 2, 3, 4, and 16, the excess material being squeezed out through the slots 6. If necessary an arbor or bar of the proper size is placed inside of the pipe during this step.

It will be evident that if thought advisable the transition from the shape of Fig. 1 to that of Figs. 2, 3, 4, and 16 may be made in more than one step, several sets of dies, gradually approaching in shape the one described, being used and the pipe being heated repeatedly if necessary.

The excess material, forced out through the slot 6 and forming the fins 7—7, is next removed by shearing it off in any preferred way, resulting in a structure such as shown in Figs. 2, 3, 4, and 16.

The next step is the bending of this structure into the shape of Fig. 6.

In some cases the bending may be done without heating the pipe, but usually heating is required. I prefer to confine the heating to an area approximately as indicated by the shading at the thickened portion in Fig. 4. This heating may be performed in any desired way, but I prefer to do it by first heating the shaded area without paying much attention to how much of the adjacent area is heated at the same time, and then cooling off the portions which are not meant to be hot, preferably by a suitably directed stream of water.

The bending is preferably performed in apparatus similar to that illustrated in Fig. 7. The two blocks 8—8 are clamped, one on each of the two pipes in such a position that their grooved lower sides engage the curved rail 9 when the rib 3 abuts against the stop 10. The rail 9 is eccentrically placed with reference to stop 10 so that as bending proceeds and both pipes are moved toward their final position the pipes are subjected to tension. This is done in order to obviate the folding tendency at the crotch, the tension being made sufficient to prevent this but not enough to thin the metal at that point. The outer thickened portion is kept from collapsing by the rib 3, and will assume the shape shown in Fig. 6. The purpose of confining the heat to approximately the area shaded in Fig. 4 is to localize the stretching to this area, which has been specially thickened for this very purpose. It will be understood that the amount of tension to be given will vary depending on the gauge of pipe used, the amount of upsetting, the size of the rib, etc., and in some cases it will be found no tension at all will be required.

If, during the bending process, the return bend does not assume the exact rounded shape desired and especially if there appears to be a question whether the free interior area has become restricted, a tool such as 11, Fig. 9, with an appropriately shaped end, is run into the bend and the bend thereby given the desired shape. This will not, however, ordinarily be required.

A modification of the step by which, and the apparatus with which the shape of Fig. 1 is transformed to that of Fig. 16, is illustrated in Figs. 14 and 15. The variation consists in having the dies used move in a direction parallel to the axis of the pipes instead of transversely to it. The two parts of the die are designated as 12 and 13 respectively. Their interior forms, in their closed position, a counterpart of the finished shape of Fig. 16, except that provision is made to permit the surplus material 14 to be extruded through a circumferentially extending slot-shaped opening 15. This surplus material is subsequently sheared off or removed in any other desired way, so that the resulting shape is identical with that made in the way first described.

Obviously other ways may be used for producing the shape of Fig. 16, and the shape itself might be considerably varied without losing the identity of the present methods. Thus the extra material forming the thickening and the rib might be welded on. Again, while I have described the return bend as being made at some point in a long pipe, so that in the finished product it is integral with the pipe lengths it connects, it will be evident that I may make separate return bends by this method, to which the pipes to be joined may be connected in any desired manner.

What I claim is:

1. The method of making a return bend comprising the steps of giving a pipe additional thickness over an area at the point where the return bend is to be produced, the thickness being maximum near one point and decreasing longitudinally and circumferentially to the normal pipe thickness; providing a circumferential rib at the point of maximum thickness; suitably heating the pipe and bending it so that the point of maximum thickness lies on the outer side of the bend formed.

2. The method of making a return bend comprising the steps of giving a pipe additional thickness over an area at the point where the return bend is to be produced, the thickness being maximum near one point and decreasing longitudinally and circumferentially to the normal pipe thickness; providing a circumferential rib at the point of maximum thickness; suitably heating the pipe and bending it so that the point of maximum thickness lies on the outer side of the bend formed, the bending being performed with the pipes in tension.

3. The method of making a return bend comprising the steps of thickening the pipe at the point of the pipe which is to form the outside of the completed bend, providing a supporting circumferentially disposed rib integral with the pipe at the point of bending, and then bending the pipe.

4. The method of making a return bend comprising the steps of thickening the wall of a pipe at the point where the return bend is to be produced; reducing the thickness over a portion of the upset area so that it is maximum at one point and decreases longitudinally and circumferentially to the normal pipe thickness; producing a circumferential rib from some of the surplus material during the reduction of the thickness, said rib being at the point of maximum thickness; and then bending the pipe so the point of maximum thickness lies on the outside of the bend.

5. The method of making a return bend comprising the steps of giving a pipe additional thickness over an area at the point where the return bend is to be produced, the thickness being maximum at one point and decreasing longitudinally and circumferentially to the normal pipe thickness; providing a circumferential rib at the point of maximum thickness; heating the pipe so it is at a drawing heat over an area extending over a portion of the thickened area on each side of the point of maximum thickness and tapering off toward the opposite side of the pipe; and bending the pipe while so heated, at the same time keeping the pipes under longitudinal tension.

6. The method of making a return bend comprising the steps of providing means integral with the pipe to support the portion which will form the outer side of the completed bend to counteract the tendency of the pipe to collapse during bending, and bending the pipe while keeping the two portions connected by the resulting return bend under tension.

BENJAMIN BROIDO.